(12) United States Patent
McMahan et al.

(10) Patent No.: US 12,351,327 B2
(45) Date of Patent: Jul. 8, 2025

(54) AIRCRAFT SAFETY LATCH

(71) Applicant: ROHR, INC., Chula Vista, CA (US)

(72) Inventors: Paul F. McMahan, College Station, TX (US); David Louis Lipson, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 161 days.

(21) Appl. No.: 17/525,684

(22) Filed: Nov. 12, 2021

(65) Prior Publication Data
US 2023/0184012 A1  Jun. 15, 2023

(51) Int. Cl.
| B64D 29/06 | (2006.01) |
|---|---|
| E05C 5/00 | (2006.01) |
| F02K 1/80 | (2006.01) |

(52) U.S. Cl.
CPC ............... B64D 29/06 (2013.01); E05C 5/00 (2013.01); F02K 1/80 (2013.01)

(58) Field of Classification Search
CPC .......... F02K 1/80; B64D 29/06; E05C 19/145
See application file for complete search history.

(56) References Cited

U.S. PATENT DOCUMENTS

| 2,945,274 | A | | 7/1960 | Paterson | |
|---|---|---|---|---|---|
| 3,083,426 | A | * | 4/1963 | Neilson | E05C 19/145 |
| | | | | | 24/68 T |
| 3,347,578 | A | | 10/1967 | Sheeran et al. | |
| 4,385,423 | A | | 5/1983 | Vermilye | |
| 4,557,441 | A | * | 12/1985 | Aspinall | B25B 25/00 |
| | | | | | 244/129.4 |
| 5,076,514 | A | | 12/1991 | Melcher | |
| 9,469,392 | B2 | | 10/2016 | Fox et al. | |
| 9,744,576 | B2 | | 8/2017 | Gaines et al. | |
| 2011/0113837 | A1 | * | 5/2011 | Soulier | B64D 29/06 |
| | | | | | 70/237 |
| 2015/0300061 | A1 | | 10/2015 | Fabre et al. | |

FOREIGN PATENT DOCUMENTS

| CH | 443018 | 8/1967 | | |
|---|---|---|---|---|
| FR | 2299485 | 8/1976 | | |
| WO | WO-2015092313 A1 | * | 6/2015 | ............. B64D 29/06 |

OTHER PUBLICATIONS

European Patent Office, European Search Report dated Mar. 23, 2023 in Application No. 22204386.1.
European Patent Office, European Search Report dated Sep. 29, 2023 in Application No. 23176213.9.

(Continued)

*Primary Examiner* — Andrew H Nguyen
(74) *Attorney, Agent, or Firm* — SNELL & WILMER L.L.P.

(57) ABSTRACT

A hook body for a latch mechanism includes a plurality of longitudinal members, each of the plurality of longitudinal members extending in a longitudinal direction with respect to the hook body; and a load slot at a proximal end of the hook body, the load slot having a loading portion and a receiving portion, the receiving portion configured to receive a transverse rod of a T-bolt and the loading portion configured to apply a load to the transverse rod upon translation of the hook body away from the transverse rod.

13 Claims, 6 Drawing Sheets

(56) References Cited

OTHER PUBLICATIONS

USPTO; Non-Final Office Action dated Aug. 29, 2023 in U.S. Appl. No. 17/716,897.
USPTO; Notice of Allowance dated Jan. 23, 2024 in U.S. Appl. No. 17/716,897.
USPTO; Notice of Allowance dated Feb. 12, 2024 in U.S. Appl. No. 17/716,897.
USPTO; Notice of Allowance dated Apr. 10, 2024 in U.S. Appl. No. 17/716,897.
European Patent Office, European Office Action dated Nov. 28, 2024 in Application No. 22204386.1.
European Patent Office, European Office Action dated Feb. 21, 2025 in Application No. 23176213.9.

\* cited by examiner

AIRCRAFT SAFETY LATCH

FIELD

The present disclosure relates generally to latch mechanisms and, more particularly, to latch mechanisms used with aircraft.

BACKGROUND

Various latch mechanisms exist for use with aircraft having enclosing components, such as, for example, fuselage panels, including cowlings and the like, which must be opened and closed securely. For example, tension latches mounted on a engine cowl panel are typically configured to cinch to a keeper on a second panel to hold the first panel, which is a moveable panel, closed relative to the second panel. Most latches include sliding toggle linkages to minimize the kinematic envelope of the latch. These linkages rotate around a mounting pin to produce the latch reach. The complexity of certain latch mechanisms due to inefficiencies makes them relatively large and heavy, which is disfavored in aircraft. Accordingly, it is desirable to provide a latch mechanism having a reduced size and weight, but also exhibits the strength of larger and heavier latches. Also desirable is a design exhibiting a robustness and reduced tendency to disengage during flight of the aircraft.

SUMMARY

A hook body for a latch mechanism is disclosed. In various embodiments, the hook body includes a plurality of longitudinal members, each of the plurality of longitudinal members extending in a longitudinal direction with respect to the hook body; and a load slot at a proximal end of the hook body, the load slot having a loading portion and a receiving portion, the receiving portion configured to receive a transverse rod of a T-bolt and the loading portion configured to apply a load to the transverse rod upon translation of the hook body away from the transverse rod.

In various embodiments, the loading portion of the load slot is a longitudinal slot extending substantially in the longitudinal direction. In various embodiments, the receiving portion of the load slot is a lateral slot extending substantially perpendicular to the longitudinal slot. In various embodiments, the loading portion of the load slot includes a loading end configured to apply a load against the transverse rod. In various embodiments, the loading portion of the load slot is configured for sliding translation with respect to the transverse rod. In various embodiments, the loading portion of the load slot includes a lateral dimension that is substantially equal to a diameter of the transverse rod. In various embodiments, the receiving portion of the load slot includes a longitudinal dimension that is substantially equal to the diameter of the transverse rod.

In various embodiments, the plurality of longitudinal members includes a first longitudinal member and a second longitudinal member, the first longitudinal member and the second longitudinal member connected to an aft flange and defining an longitudinal cutout extending longitudinally between the load slot and the aft flange. In various embodiments, the longitudinal cutout is configured to receive a pin and enable the hook body to slide in the longitudinal direction with respect to the pin.

A latch mechanism is disclosed. In various embodiments, the latch mechanism includes a hook body, the hook body including a plurality of longitudinal members, each of the plurality of longitudinal members extending in a longitudinal direction with respect to the hook body, and a load slot at a proximal end of the hook body, the load slot having a loading portion and a receiving portion, the loading portion extending in the longitudinal direction and the receiving portion extending in a lateral direction with respect to the longitudinal direction; and a T-bolt having a longitudinal rod and a transverse rod connected to the longitudinal rod and configured to slide within the receiving portion and the loading portion of the load slot.

In various embodiments, the loading portion of the load slot is a longitudinal slot extending substantially in the longitudinal direction. In various embodiments, the receiving portion of the load slot is a lateral slot extending substantially perpendicular to the longitudinal slot. In various embodiments, the loading portion of the load slot includes a loading end configured to apply a load against the transverse rod.

In various embodiments, a plate member is included and configured to slidingly receive the longitudinal rod. In various embodiments, the longitudinal rod includes a distal end configured to threadedly receive an adjustment nut. In various embodiments, a bias element is included and configured to bias the longitudinal rod away from the plate member. In various embodiments, the longitudinal rod includes a disc connected to the longitudinal rod and configured to abut a first end of the bias element and the plate member is configured to abut a second end of the bias element.

A method of coupling a first cowl panel to a second cowl panel is disclosed. In various embodiments, the method includes rotating a load slot formed within a hook body coupled to the first cowl panel toward a transverse rod coupled to the second cowl panel; receiving the transverse rod within a receiving portion of the load slot; and translating the transverse rod within a loading portion of the load slot until the transverse rod is in abutting engagement with a loading end of the loading portion.

In various embodiments, the loading portion of the load slot is a longitudinal slot extending substantially in a longitudinal direction with respect to the hook body. In various embodiments, the receiving portion of the load slot is a lateral slot extending substantially perpendicular to the longitudinal slot.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
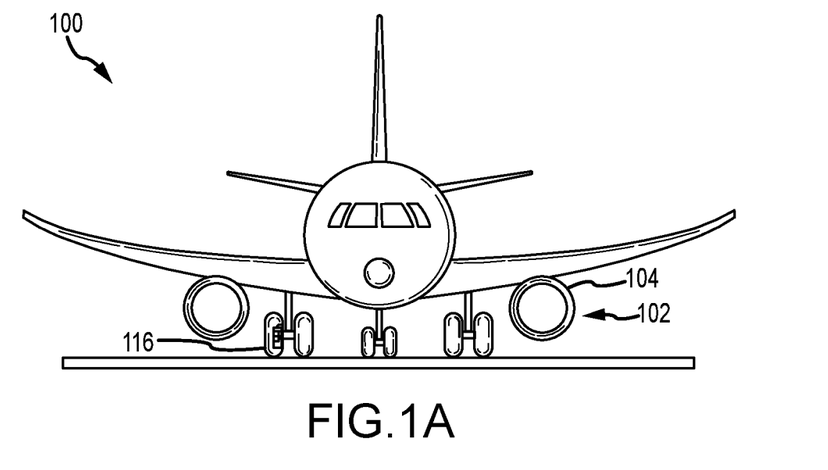
FIGS. 1A and 1B provide schematic illustrations of an aircraft having and aircraft propulsion system, in accordance with various embodiments.
Figure 1B:
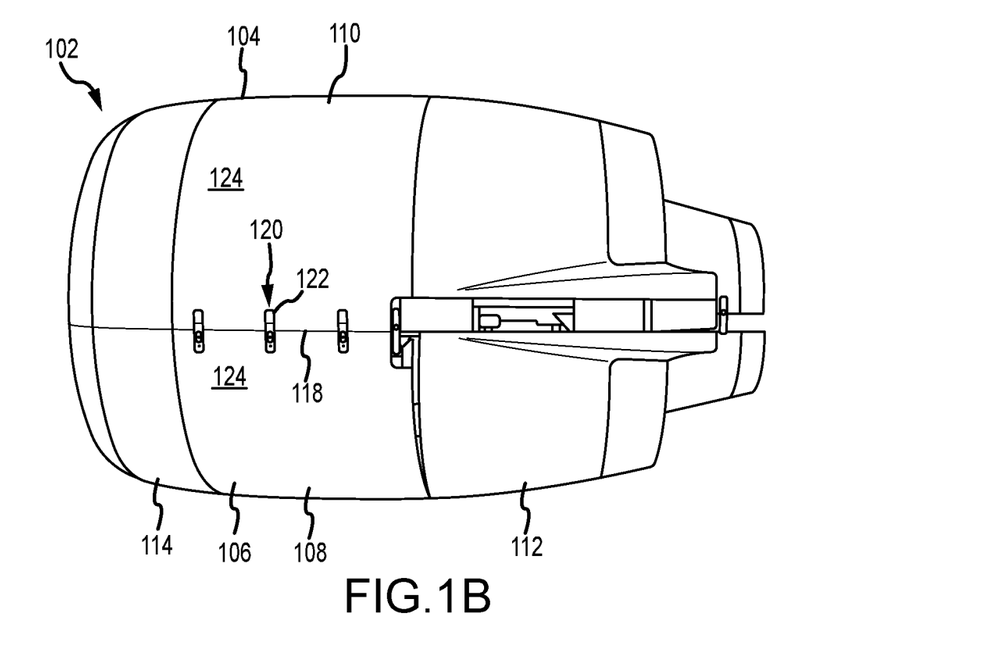

Referring now to the drawings, FIGS. 1A and 1B provide schematic illustrations of an aircraft 100 having and an aircraft propulsion system 102, in accordance with various embodiments. The aircraft propulsion system 102 may include various systems, such as, for example, a gas turbine engine system housed within a nacelle 104. The nacelle 104 typically comprises a plurality of aerodynamic panels, such as, for example, one or more core cowl panels 106 (e.g., a first core cowl panel 108 and a second core cowl panel 110), one or more thrust reverser panels 112 and one or more fan cowl panels 114 (collectively referred to as cowl panels), each of which may be removable, hinged, or otherwise configurable to enable access to internal components of the aircraft 100 or the aircraft propulsion system 102. The aircraft 100 may also include various additional systems, such as, for example, one or more landing gear 116, which generally support the aircraft 100 when the aircraft 100 is not flying, allowing the aircraft 100 to taxi, takeoff or land without damage.

In various embodiments and with additional reference to the nacelle 104 illustrated in FIG. 1B, the first core cowl panel 108 and the second core cowl panel 110 are coupled, in various embodiments, along a seam 118 by a latch mechanism 120 (or a plurality of latch mechanisms). In the latched state, a latch handle 122 of the latch mechanism 120 may sit relatively flush or may be recessed within an aerodynamic panel surface 124 defined by the first core cowl panel 108 and the second core cowl panel 110. In the unlatched state, the latch handle 122 of the latch mechanism 120 may protrude above or outside of the aerodynamic panel surface 124. While the foregoing description of the latch mechanism 120 is presented with reference to the first core cowl panel 108 and the second core cowl panel 110, a similar description may be provided with reference to other panel assemblies of the aircraft 100 or the aircraft propulsion system 102, including, for example, the one or more thrust reverser panels 112 and the one or more fan cowl panels 114.

Figure 2:
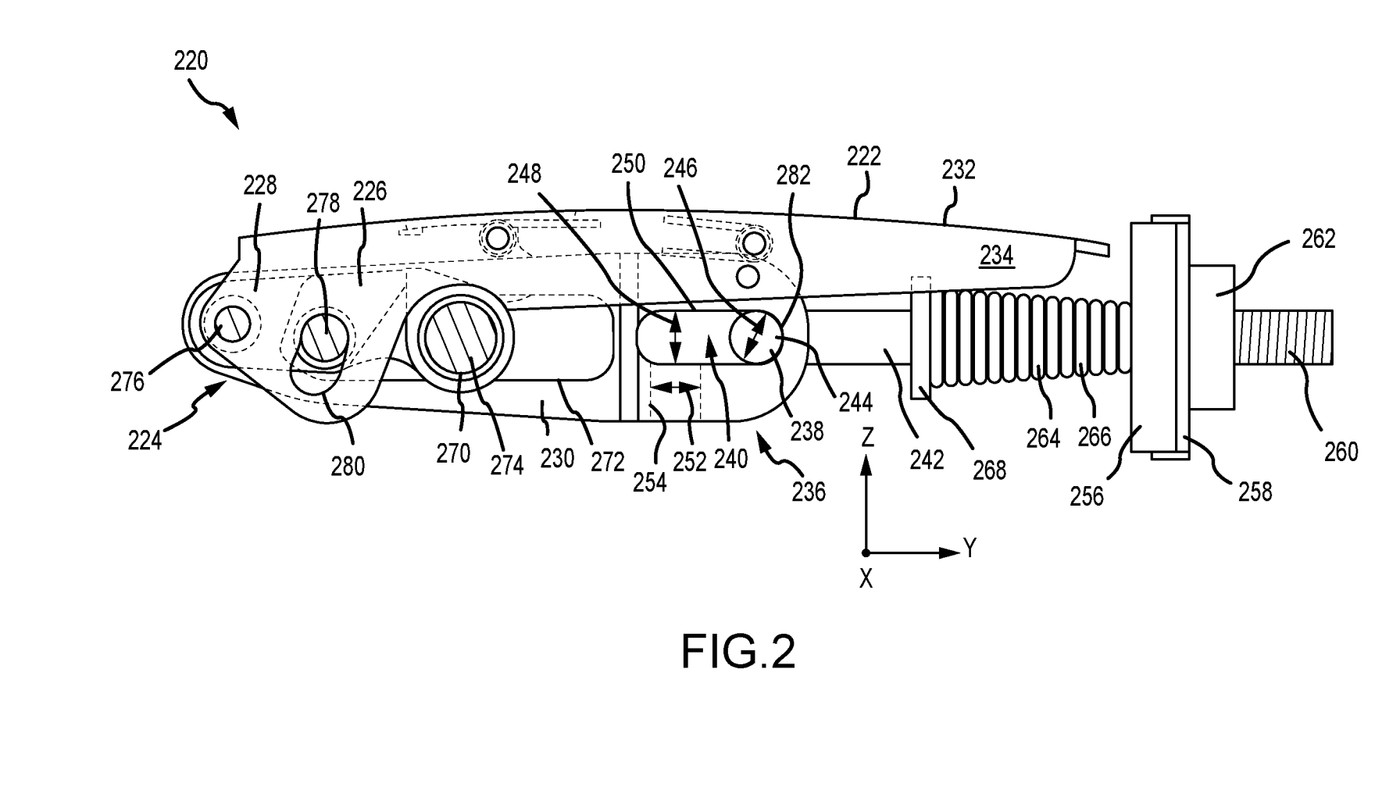
FIG. 2 provides a schematic illustration of a latch mechanism, in accordance with various embodiments.

Referring now to FIG. 2, a latch mechanism 220 (e.g., a latch mechanism for an aircraft panel), similar to the latch mechanism 120 described above with reference to FIG. 1B, is illustrated and its operation described. The latch mechanism 220 comprises a latch handle 222 coupled to a latch linkage 224 and a hook body 230. In various embodiments, the latch linkage 224 includes a first link 226 (or a forward link) and a second link 228 (or an aft link). The latch handle 222 includes an upper surface 232 extending between a first face 234 and a second face (opposite the first face 234) to define, in cross section through the ZX-plane, a relatively U-shaped latch handle or latch handle 222. The latch mechanism 220 also includes a lock mechanism 236, including a T-bolt 238 and a load slot 240 configured to receive and hold the T-bolt 238 when the latch mechanism 220 is in an engaged state. In various embodiments, the T-bolt 238 is a T-shaped piece of material (e.g., metal) having a longitudinal rod 242 (e.g., a first rod extending in the Y-direction or a longitudinal direction) and a transverse rod 244 (e.g., a second rod extending in the X-direction or a lateral direction). In various embodiments, the transverse rod 244 defines a diameter 246 (or a characteristic dimension) that is approximately equal to a lateral dimension 248 (i.e., in the Z-direction) of a T-bolt loading portion 250 (or a longitudinal slot) of the load slot 240 and to a longitudinal dimension 252 (i.e., in the Y-direction) of a T-bolt receiving portion 254 (or a lateral slot) of the load slot 240. As illustrated, in various embodiments, the T-bolt loading portion 250 (or longitudinal slot) and the T-bolt receiving portion 254 (or lateral slot) are generally perpendicular to one another in the YZ-plane. Note that while the longitudinal rod 242 and the transverse rod 244 are described and illustrated as having generally circular cross-sectional geometries, other cross-sectional geometries, such as, for example, square or N-pentagonal (where N is the number of sides) cross-sectional geometries are also contemplated.

Still referring to FIG. 2, the longitudinal rod 242 of the T-bolt 238 is configured to slidably extend through a plate member 256 that is itself mounted to, for example, a first cowl panel (e.g., one of the first core cowl panel 108 or the second core cowl panel 110 described above). The longitudinal rod 242 is also configured to slidably extend through a bearing block 258 that is itself mounted to the plate member 256. A distal end 260 of the longitudinal rod 242 includes a threaded portion configured to threadedly receive an adjustment nut 262 that is configured to provide a preload or take-up adjustment to the T-bolt 238. In various embodiments, a bias element 264 is configured to apply a longitudinal load to the T-bolt 238 to assist in maintaining the longitudinal rod 242 is a generally longitudinal direction (e.g., a direction that is perpendicular to the XZ-plane extending through the plate member 256, particularly when the hook body 230 and the T-bolt 238 are disengaged from one another. The bias element 264, in various embodiments, is a coil spring 266 having a first end configured to abut the plate member 256 and a second end configured to abut a disc member 268 that is itself attached to the longitudinal rod 242.

Further components of the latch mechanism 220 include an axle 270 that is, for example, coupled to a second cowl panel (e.g., the one of the first core cowl panel 108 or the second core cowl panel 110 that is opposite the one to which the plate member 256 is connected). The first link 226 is configured to pivot about the axle 270 and to slide in an axial direction (i.e., in the Y-direction) with respect to a longitudinal cutout 272 of the hook body 230. The axle 270 extends through the longitudinal cutout 272 and is typically connected to the second cowl panel via a first pin 274 (or a forward pin) that extends through the axle 270. The second link 228 is pivotally connected to the latch handle 222 and to the hook body 230 via a second pin 276 (or an aft pin), while both the first link 226 and the second link 228 are pivotally connected to each other via a third pin 278.

In operation, (e.g., when decoupling the first core cowl panel 108 and the second core cowl panel 110), the latch handle 222 is rotated about the second pin 276 and away from the hook body 230, causing the first link 226 and the second link 228 to articulate with respect to each other about the third pin 278. The mutual articulation about the third pin 278, caused by engagement of a channel 280 cut into the latch handle 222 with the third pin 278, thereby further causes the hook body 230, together with the load slot 240, to be urged in a longitudinal direction (i.e., the +Y-direction) with respect to the first pin 274, which remains stationary with respect to the cowl panel to which the hook body 230 of the latch mechanism 220 is connected (e.g., the first core cowl panel 108, with the plate member 256 being connected to the second core cowl panel 110). Once the load slot 240 is decoupled from the transverse rod 244 of the T-bolt 238, the first core cowl panel 108 and the second core cowl panel 110 may be decoupled. Coupling the first core cowl panel 108 and the second core cowl panel 110 is accomplished by reversing the operational steps above described, whereby upon rotating the latch handle 222 toward the hook body 230, the hook body 230 and the load slot 240 are urged in the opposite longitudinal direction (i.e., the −Y-direction) with respect to the first pin 274, thereby causing the load slot 240 to apply a longitudinal load to the transverse rod 244 of the T-bolt 238.

In various embodiments, the coupling and decoupling of the latch mechanism 220 to the T-bolt 238 may be adjusted by adjusting the location of the transverse rod 244 of the T-bolt 238 with respect to the hook body 230 using an adjustment mechanism that comprises, for example, the adjustment nut 262 threadedly coupled to the distal end 260 of the longitudinal rod 242. Rotating the adjustment nut 262 in a first direction, for example, increases the distance (or longitudinal position) between the transverse rod 244 and a loading end 282 of the load slot 240 of the hook body 230, while rotating the adjustment nut 262 in a second direction decreases the distance (or longitudinal position) between the transverse rod 244 and the loading end 282 of the load slot 240. In various embodiments, the bearing block 258 is positioned between the adjustment nut 262 and the plate member 256 and serves to distribute the load provided by the adjustment nut 262 throughout the plate member 230 when the latch mechanism 220 assumes an engaged state.

Figure 3A:
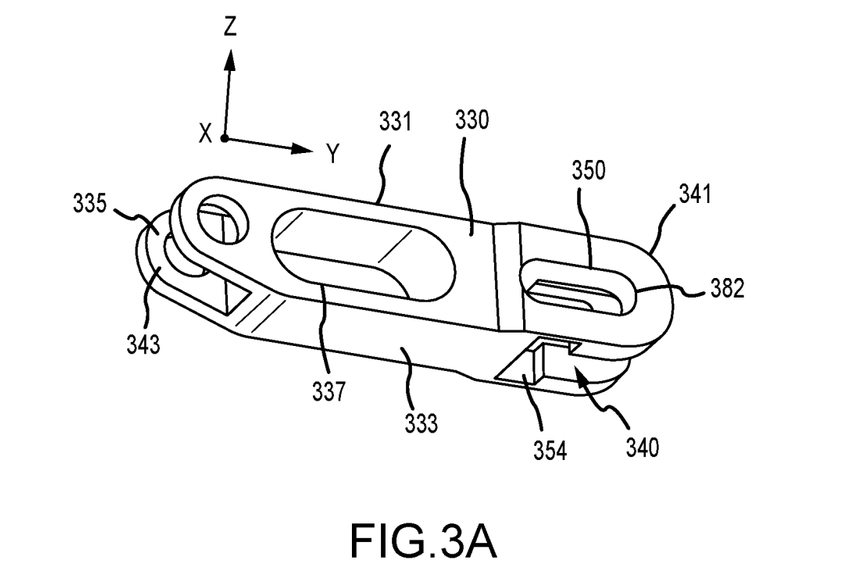
FIGS. 3A, 3B and 3C provide perspective schematic illustrations of a hook body (FIG. 3A), a hook body and lock mechanism in a disengaged state (FIG. 3B) and a hook body and lock mechanism in an engaged state (FIG. 3C), in accordance with various embodiments.
Figure 3B:
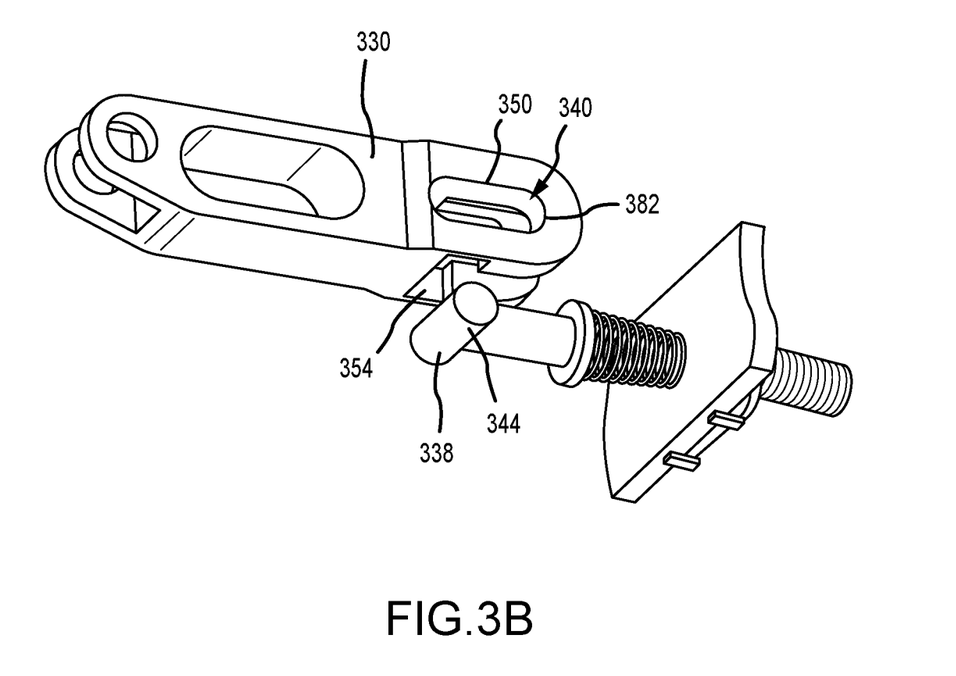
Figure 3C:
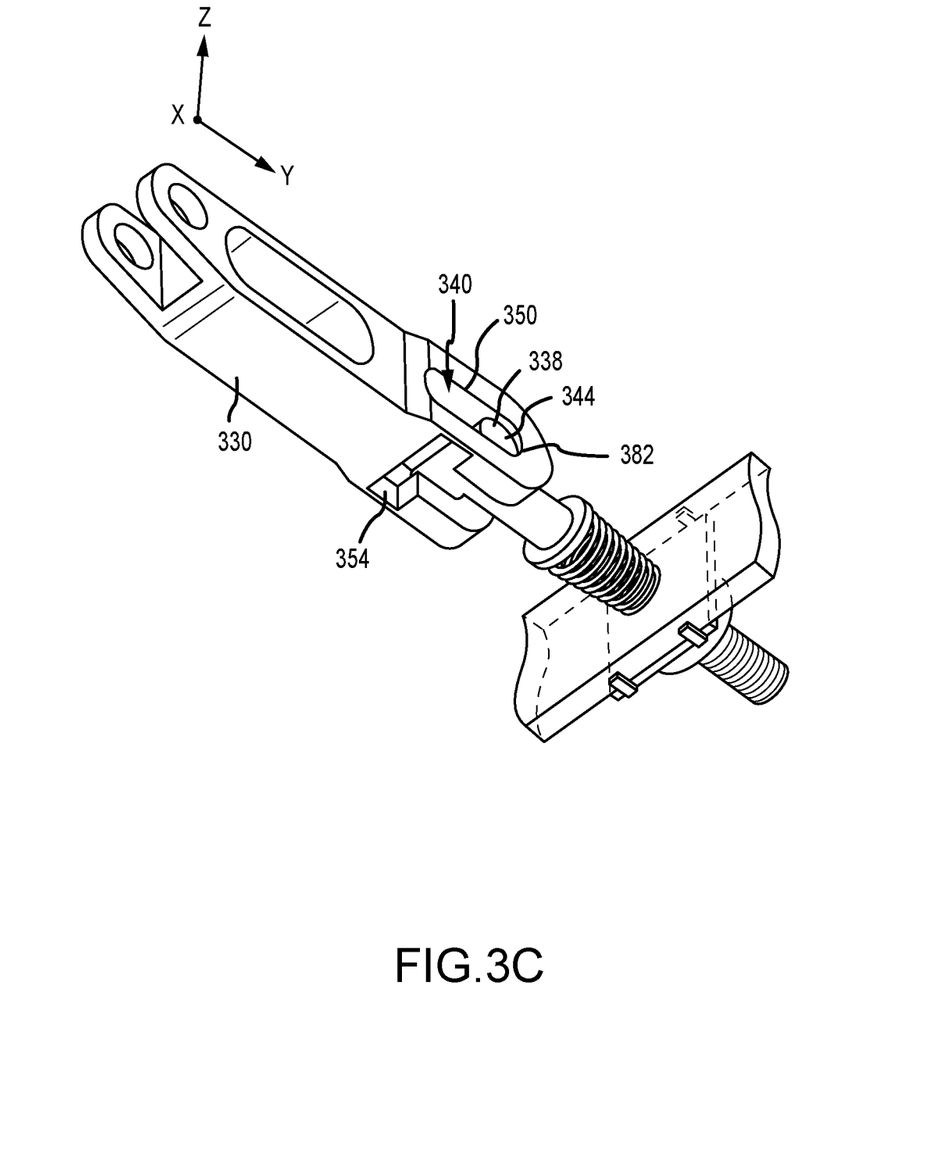

Referring now to FIGS. 3A, 3B and 3C, perspective schematic illustrations of a hook body 330 (FIG. 3A), the hook body 330 and a T-bolt 338 (or a lock mechanism) in a disengaged state or decoupled state (FIG. 3B) and the hook body 330 and the T-bolt 338 in an engaged state or coupled state (FIG. 3C) are provided. The hook body 330 includes a plurality of longitudinal members extending in a longitudinal direction (i.e., the Y-direction), including a first longitudinal member 331 and a second longitudinal member 333, the second longitudinal member 333 spaced a lateral distance (i.e., in the Z-direction) from the first longitudinal member 331. As described above, the hook body 330 further includes a load slot 340 disposed at a proximal end 341, with the load slot 340 having a T-bolt loading portion 350 (or a longitudinal slot) and a T-bolt receiving portion 354 (or a lateral slot). In various embodiments, the first longitudinal member 331 and the second longitudinal member 333 are connected to an aft flange 335 (or a pair of aft flanges) disposed at a distal end 343 of the hook body 330 and define a longitudinal cutout 337 extending longitudinally between the load slot 340 and the aft flange 335, wherein the longitudinal cutout 337 is configured to receive a pin (e.g., the first pin 274 described above) and enable the hook body 330 to slide in the longitudinal direction and rotate with respect to the pin. As illustrated in FIG. 3B, prior to coupling the T-bolt 338 with the hook body 330, a transverse rod 344 of the T-bolt 338 is aligned with the T-bolt receiving portion 354 of the load slot 340. Once aligned, the transverse rod 344 is inserted into the T-bolt receiving portion 354 and translated toward the T-bolt loading portion 350, typically by rotating the hook body 330 toward the transverse rod 344. As illustrated in FIG. 3C, once the transverse rod 344 is disposed within the T-bolt loading portion 350 of the load slot 340, the hook body 330 is translated in a longitudinal direction (i.e., the −Y direction) until a loading end 382 of the T-bolt loading portion 350 is engaged and loaded against the transverse rod 344. The T-bolt 338 and the hook body 320 are then coupled or engaged. Decoupling or disengaging the T-bolt 338 and the hook body 330 is accomplished by reversing the steps outlined above.

Figure 4A:
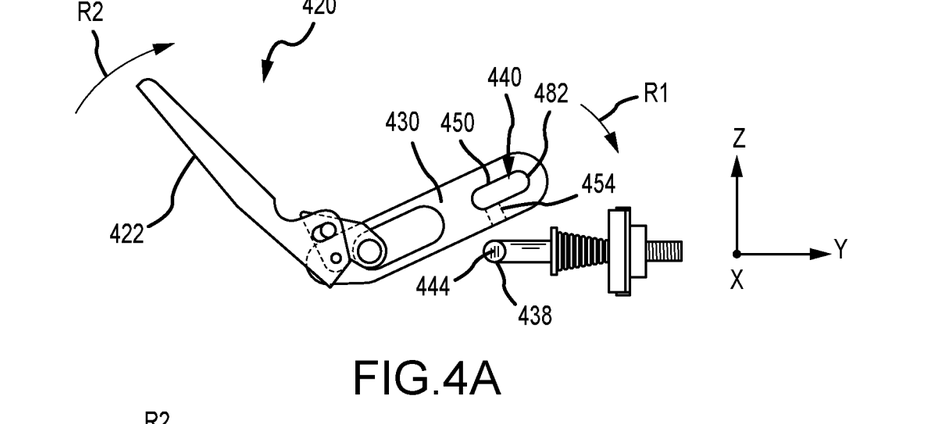
FIGS. 4A, 4B and 4C provide side schematic illustrations of a latch mechanism and various stages of engagement of the hook body and lock mechanism, in accordance with various embodiments.
Figure 4B:
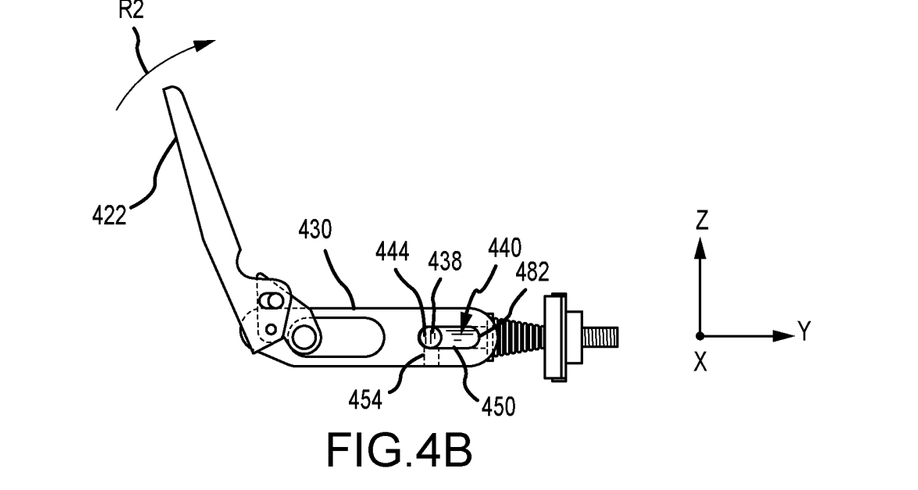
Figure 4C:
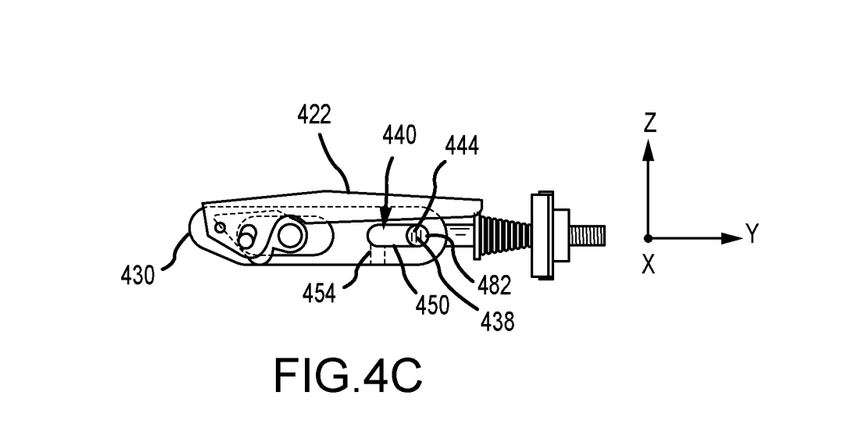

Referring now to FIGS. 4A, 4B and 4C, schematic illustrations of a latch mechanism 420 having hook body 430 and a T-bolt 438 (or a lock mechanism) are provided to further describe the process of coupling or engaging the hook body 430 to the T-bolt 438. As described above, the hook body 430 includes a load slot 440, with the load slot 440 having a T-bolt loading portion 450 (or a longitudinal slot) and a T-bolt receiving portion 454 (or a lateral slot). As illustrated in FIG. 4A, prior to coupling the T-bolt 438 with the hook body 430, a transverse rod 444 of the T-bolt 438 is aligned with the T-bolt receiving portion 454 of the load slot 440. Once aligned, the transverse rod 444 is inserted into the T-bolt receiving portion 454 and translated toward the T-bolt loading portion 450, typically by rotating ($R_1$) the hook body 430 toward the transverse rod 444 by operating or rotating ($R_2$) a latch handle 422 toward the hook body 430 in the direction shown and as described above and with reference to FIG. 2. As illustrated in FIG. 4B, once the transverse rod 444 is disposed within the T-bolt loading portion 450 of the load slot 440, the hook body 430 is translated in a longitudinal direction (i.e., the −Y direction) until a loading end 482 of the T-bolt loading portion 450 is engaged and loaded against the transverse rod 444. The T-bolt 438 and the hook body 430 are then coupled or engaged. Decoupling or disengaging the T-bolt 438 and the hook body 430 is accomplished by reversing the steps outlined above.

Figure 5:
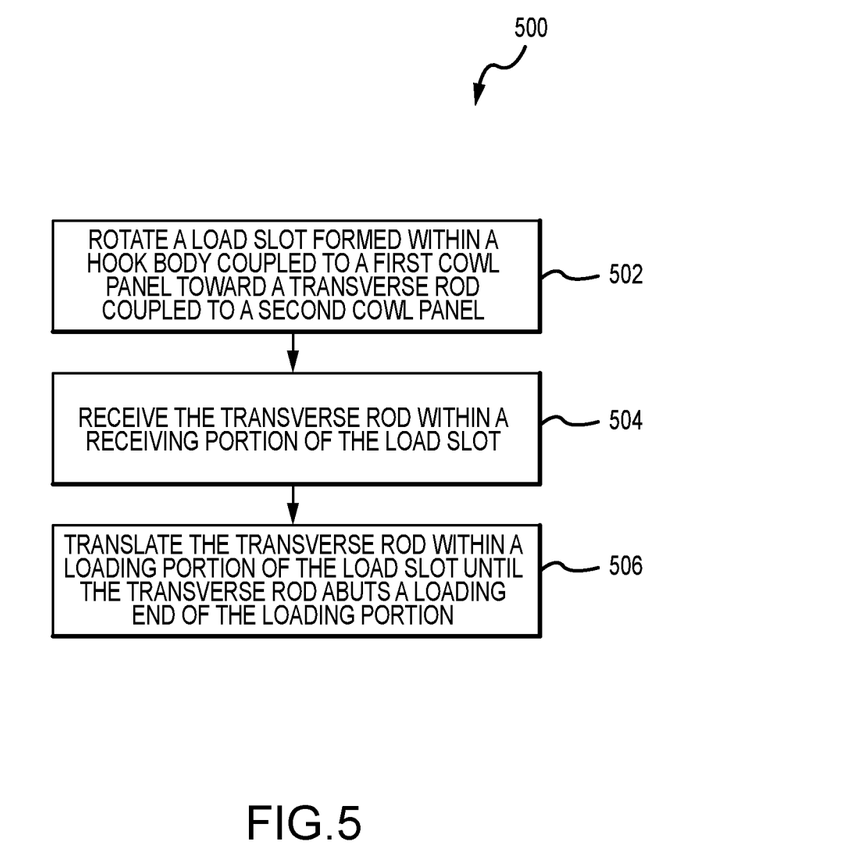
FIG. 5 describes various steps of a method for coupling a first cowl panel to a second cowl panel, in accordance with various embodiments.

Referring now to FIG. 5, a method 500 of coupling a first cowl panel to a second cowl panel is described. A first step 502 includes rotating a load slot formed within a hook body coupled to the first cowl panel toward a transverse rod coupled to the second cowl panel. A second step 504 includes receiving the transverse rod within a receiving portion of the load slot. A third step 506 includes translating the transverse rod within a loading portion of the load slot until the transverse rod abuts a loading end of the loading portion.

The foregoing disclosure provides a hook body and a latch mechanism that constrains the loads experienced by the hook body to lie primarily in a longitudinal direction, thereby preventing or reducing various moments or torques that might otherwise occur when loading the latch mechanism. Reducing the moments or torques enables the loads experienced by the various components to be confined to pure axial loads, typically in tension, when the latch mechanism is in a deployed, coupled or engaged state. The load distribution facilitates smaller, lighter and more compact hook bodies to be incorporated into a latch mechanism. In addition, the disclosure provides for a latch mechanism that provides additional safety over more conventional hook and pin assemblies for latch mechanisms, whereby a hook disposed at an end of the hook body is configured to engage the pin. For example, as described above, at least two separate motions of the hook body are required to separate the hook body from the T-bolt, the first being a longitudinal translation of the hook body (or the loading portion of the load slot) with respect to a transverse rod of the T-bolt and the second being a lateral translation of the hook body (or the receiving portion of the load slot) with respect to the transverse rod. The two separate motions make the occurrence of an unintended decoupling or disengagement of the hook body from the T-bolt very unlikely. These features of the hook body and T-bolt enable the disclosed latch mechanism to remain engaged, even in the event a latch handle is lost becomes detached from the hook body, thereby minimizing the risk of loosing a cowl panel during flight.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A hook body for a safety latch mechanism, comprising:
a plurality of longitudinal members, each of the plurality of longitudinal members extending in a longitudinal direction with respect to the hook body; and
a load slot at a proximal end of the hook body, the load slot having a loading portion and a receiving portion, wherein the receiving portion comprises a first set of four walls extending substantially perpendicular from an outer surface of the hook body to the loading portion with one wall of the first set of four walls comprising a receiving cutout for a longitudinal rod of a T-bolt and wherein the loading portion comprises two second sets of four walls substantially parallel to the hook body and substantially perpendicular to the receiving portion and extending from a first end of the loading portion to a second end of the loading portion with each of the second sets of four walls configured to receive a respective end of a transverse rod of the T-bolt, wherein, during engagement:
the receiving portion positioned at the first end of the loading portion is configured to receive, in a first direction, the transverse rod of the T-bolt; and
the loading portion is configured to allow the transverse rod to translate, in a second direction perpendicular to the first direction, along a length of the loading portion until the transverse rod engages with a loading end at the second end of the loading portion opposite the first end in order to apply a load to the transverse rod upon translation of the hook body away from the transverse rod,
wherein, during disengagement:
the loading portion is configured to allow the transverse rod to translate, in a third direction opposite the second direction, along the length of the loading portion until the transverse rod reaches the receiving portion; and
the receiving portion is configured to allow the transverse rod to release, in a fourth direction that is perpendicular to the third direction and opposite the first direction, from the load slot,
wherein the plurality of longitudinal members includes a first longitudinal member and a second longitudinal member, the first longitudinal member and the second longitudinal member connected to an aft flange and defining a longitudinal cutout extending longitudinally between the load slot and the aft flange,
wherein the longitudinal cutout is configured to receive a pin and enable the hook body to slide in the longitudinal direction with respect to the pin, the pin coupled to an axle of the safety latch mechanism that is further coupled to a latch handle,
wherein upon rotating the latch handle of the safety latch mechanism toward the hook body, responsive to the pin pushing on a distal end of the longitudinal cutout away from the T-bolt, the hook body and the load slot are urged in an opposite longitudinal direction with respect to the pin, thereby causing the load slot to apply the load to the transverse rod of the T-bolt, and
wherein the translation of the transverse rod in the third direction and the fourth direction along the length of the loading portion prevents unintended decoupling or disengagement of the hook body from the T-bolt in an event the latch handle becomes detached from the hook body thereby forming the safety latch mechanism.

2. The hook body of claim 1, wherein the loading portion of the load slot is a longitudinal slot extending substantially in the longitudinal direction.

3. The hook body of claim 2, wherein the receiving portion of the load slot is a lateral slot extending substantially perpendicular to the longitudinal slot.

4. The hook body of claim 1, wherein the loading portion of the load slot is configured for sliding translation with respect to the transverse rod.

5. The hook body of claim 4, wherein the loading portion of the load slot includes a lateral dimension that is substantially equal to a diameter of the transverse rod.

6. The hook body of claim 5, wherein the receiving portion of the load slot includes a longitudinal dimension that is substantially equal to the diameter of the transverse rod.

7. A safety latch mechanism, comprising:
a hook body, the hook body including a plurality of longitudinal members, each of the plurality of longitudinal members extending in a longitudinal direction with respect to the hook body, and a load slot at a proximal end of the hook body, the load slot having a loading portion and a receiving portion, the loading portion extending in the longitudinal direction and the receiving portion extending in a lateral direction with respect to the longitudinal direction, wherein the receiving portion comprises a first set of four walls extending substantially perpendicular from an outer surface of the hook body to the loading portion with one wall of the first set of four walls comprising a receiving cutout for a longitudinal rod of a T-bolt and wherein the loading portion comprises two second sets of four walls substantially parallel to the hook body and substantially perpendicular to the receiving portion and extending from a first end of the loading portion to a second end of the loading portion with each of the second sets of four walls configured to receive a respective end of a transverse rod of the T-bolt; and
the T-bolt having the longitudinal rod and the transverse rod connected to the longitudinal rod and configured to slide within the receiving portion and the loading portion of the load slot,
wherein the plurality of longitudinal members includes a first longitudinal member and a second longitudinal member, the first longitudinal member and the second longitudinal member connected to an aft flange and defining a longitudinal cutout extending longitudinally between the load slot and the aft flange,
wherein the longitudinal cutout is configured to receive a pin and enable the hook body to slide in the longitudinal direction with respect to the pin, the pin coupled to an axle of the safety latch mechanism that is further coupled to a latch handle,
wherein upon rotating the latch handle of the safety latch mechanism toward the hook body, responsive to the pin pushing on a distal end of the longitudinal cutout away from the T-bolt, the hook body and the load slot are urged in an opposite longitudinal direction with respect to the pin, thereby causing the load slot to apply a longitudinal load to the transverse rod of the T-bolt;
wherein, during engagement:
the receiving portion positioned at the first end of the loading portion is configured to receive, in a first direction, the transverse rod of the T-bolt; and
the loading portion is configured to allow the transverse rod to translate, in a second direction perpendicular to the first direction, along a length of the loading portion until the transverse rod engages with a loading end at the second end of the loading portion opposite the first end in order to apply a load to the transverse rod upon translation of the hook body away from the transverse rod,
wherein, during disengagement:
the loading portion is configured to allow the transverse rod to translate, in a third direction opposite the second direction, along the length of the loading portion until the transverse rod reaches the receiving portion; and
the receiving portion is configured to allow the transverse rod to release, in a fourth direction that is perpendicular to the third direction and opposite the first direction, from the load slot, and
wherein the translation of the transverse rod in the third direction and the fourth direction along the length of the loading portion prevents unintended decoupling or disengagement of the hook body from the T-bolt in an event the latch handle becomes detached from the hook body thereby forming the safety latch mechanism.

8. The safety latch mechanism of claim 7, wherein the loading portion of the load slot is a longitudinal slot extending substantially in the longitudinal direction.

9. The safety latch mechanism of claim 8, wherein the receiving portion of the load slot is a lateral slot extending substantially perpendicular to the longitudinal slot.

10. The safety latch mechanism of claim 7, further comprising a plate member configured to slidingly receive the longitudinal rod.

11. The safety latch mechanism of claim 10, wherein the longitudinal rod includes a distal end configured to threadedly receive an adjustment nut.

12. The safety latch mechanism of claim 11, further comprising a bias element configured to bias the longitudinal rod away from the plate member.

13. The safety latch mechanism of claim 12, wherein the longitudinal rod includes a disc connected to the longitudinal rod and configured to abut a first end of the bias element and the plate member is configured to abut a second end of the bias element.

* * * * *